United States Patent
Satterfield et al.

(10) Patent No.: US 7,979,878 B2
(45) Date of Patent: *Jul. 12, 2011

(54) PROGRAM GUIDE SYSTEM WITH BROWSING DISPLAY

(75) Inventors: Kevin D. Satterfield, Mannford, OK (US); Thomas R. Lemmons, Sand Springs, OK (US); Jennifer E. Nelson, Mannford, OK (US); Connie T. Marshall, Muskogee, OK (US); Brent E. Perry, Tulsa, OK (US)

(73) Assignee: United Video Properties, Inc., Tulsa, OK (US)

( * ) Notice: Subject to any disclaimer, the term of this patent is extended or adjusted under 35 U.S.C. 154(b) by 76 days.

This patent is subject to a terminal disclaimer.

(21) Appl. No.: 12/364,069

(22) Filed: Feb. 2, 2009

(65) Prior Publication Data

US 2010/0005490 A1   Jan. 7, 2010

Related U.S. Application Data

(63) Continuation of application No. 09/054,917, filed on Apr. 2, 1998, now Pat. No. 6,564,378.

(60) Provisional application No. 60/067,953, filed on Dec. 8, 1997.

(51) Int. Cl.
    *H04N 5/445* (2011.01)
(52) U.S. Cl. .......................................... 725/40
(58) Field of Classification Search .................. None
    See application file for complete search history.

(56) References Cited

U.S. PATENT DOCUMENTS 5,850,218 A * 12/1998 LaJoie et al. .................... 725/45
6,239,794 B1 * 5/2001 Yuen et al. ....................... 725/41

* cited by examiner

*Primary Examiner* — William Trost, IV
*Assistant Examiner* — Oschta Montoya
(74) *Attorney, Agent, or Firm* — Ropes & Gray LLP

(57) ABSTRACT

An inter pap active television program guide system is provided in which a user may direct the program guide to display a browsing display screen. The browsing display screen includes a list of current programs including a movable highlight region, a video window containing a television program to which the system is currently tuned, and a detailed description of the highlighted program listing. The user may position the highlight region using remote control cursor keys. The user may then synchronize the content of the video window with the highlighted program listing by pressing a select key or a channel up or down key. If the user changes channels repeatedly using the channel up and down keys, the contents of the video window and the highlighted program listings remain in synchronization.

36 Claims, 12 Drawing Sheets

| MSO LOGO | NOW SHOWING | | LOGO |
|---|---|---|---|
| | NOW SHOWING | CHANNEL 17 | |
| 17 KDOK | JEFF FENHOLT | VIDEO FOR CHANNEL 17 | |
| 18 SHOW | ORIGINAL GANGSTAS | | |
| 19 TPS | CLASSIC ARTS SHOWCASE | | |
| 20 UNI | MAITE | DESCRIPTION FOR CHANNEL 19 | |
| 21 TCC | CSC - 1501 | | |
| 22 STAR | HEAVY | | |

FIG. 7

| MSO LOGO | NOW SHOWING | | LOGO |
|---|---|---|---|
| | NOW SHOWING | CHANNEL 19 | |
| 17 KDOK | JEFF FENHOLT | VIDEO FOR CHANNEL 19 | |
| 18 SHOW | ORIGINAL GANGSTAS | | |
| 19 TPS | CLASSIC ARTS SHOWCASE | | |
| 20 UNI | MAITE | DESCRIPTION FOR CHANNEL 19 | |
| 21 TCC | CSC - 1501 | | |
| 22 STAR | HEAVY | | |

FIG. 8

| MSO LOGO | NOW SHOWING | | LOGO |
|---|---|---|---|
| | NOW SHOWING | CHANNEL 18 | |
| 17 KDOK | JEFF FENHOLT | | |
| 18 SHOW | ORIGINAL GANGSTAS | VIDEO FOR CHANNEL 18 | DESCRIPTION FOR CHANNEL 18 |
| 19 TPS | CLASSIC ARTS SHOWCASE | | |
| 20 UNI | MAITE | | |
| 21 TCC | CSC-1501 | | |
| 22 STAR | HEAVY | | |

FIG. 9

| MSO LOGO | NOW SHOWING | | LOGO |
|---|---|---|---|
| | NOW SHOWING | CHANNEL 18 | |
| 22 STAR | HEAVY | VIDEO FOR CHANNEL 18 | |
| 23 TBS | NEVER SAY NEVER | | |
| 24 MTV | MUSIC VIDEOS | | |
| 25 HBO | TERMINATOR | DESCRIPTION FOR CHANNEL 22 | |
| 26 ESPN | BASEBALL | | |
| 27 CNN | NEWS | | |

| MSO LOGO | NOW SHOWING | | LOGO |
|---|---|---|---|
| | NOW SHOWING | CHANNEL 17 | |
| 17 KDOK | JEFF FENHOLT | VIDEO FOR CHANNEL 17 | |
| 18 SHOW | ORIGINAL GANGSTAS | | |
| 19 TPS | CLASSIC ARTS SHOWCASE | | |
| 20 UNI | MAITE | DESCRIPTION FOR CHANNEL 17 | |
| 21 TCC | CSC-1501 | | |
| 22 STAR | HEAVY | | |

PROGRAM GUIDE SYSTEM WITH BROWSING DISPLAY

This application is a continuation of U.S. patent application Ser. No. 09/054,917, filed Apr. 2, 1998, now U.S. Pat. No. 6,564,378, which claims the benefit of U.S. provisional patent application No. 60/067,953, filed Dec. 8, 1997. Both of these patent applications are hereby incorporated by reference herein in their entireties.

BACKGROUND OF THE INVENTION

This invention relates to interactive television program guides, and more particularly, to television program guides with a display screen that may be used when browsing for available television programs. A program list and an associated video window may be displayed in the display screen at the same time.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid or table of program listings organized in a channel-ordered or a time-ordered list. Users may also search and sort program listings by genre (e.g., movies, sports, etc.) or by title (i.e., alphabetically). A user may obtain additional information for a program by placing a highlight region on a desired program listing and pressing an "info" button. The user may purchase a pay program from the program guide by placing the highlight region on a program listing and pressing an "OK" button. Some systems allow the user to select a program for recording by placing the highlight region on a program listing and pressing a "record" button.

Some program guides allow users to display a list of current programming on the user's display screen as an overlay on top of a television channel. With one such system, the user may scroll a highlight region through the list of programming while monitoring the program to which the system is tuned in a quarter-screen window. A description of the highlighted program may also be provided.

This type of system always maintains the video for the television channel and the text of the description in complete synchronization with the highlighted program. Whenever the highlight region is repositioned on a new program listing, the system automatically tunes to the television channel for that program. The user cannot browse through the program listings without loosing track of what is on the channel to which the user was originally tuned. Moreover, the program list that this type of system displays has cells of program information for programs that are scheduled to be broadcast in the future as well as current programs, which tends to clutter the display.

Another program guide feature that allows users to display current programming information as an overlay on top of a television channel is the so-called browse feature available in some program guides. With this type of arrangement, the user is only presented with the title of a single program listing, so that the user cannot review a number of listings at a time. The title information also obscures a portion of the television channel being broadcast, which interferes with the user's ability to monitor that channel. No program descriptions are listed on the browse display screen. If the user is interested in a program title listed on the browse display, the user may tune to that channel by pressing a select key. However, this will cause the program guide to exit the browse mode.

It is therefore an object of the present invention to provide a program guide system with improved browsing capabilities.

SUMMARY OF THE INVENTION

These and other objects of the invention are accomplished in accordance with the principles of the present invention by providing an interactive television program guide system in which the user may direct the program guide to display a browsing display screen. The browsing display screen contains information about the programs that are currently being broadcast.

The browsing display contains a program list that contains only program listings for programs that are currently being broadcast. Future programs that are not being currently being broadcast are not contained in the list. The program list contains a highlight region that the user may position using cursor keys, page up and down keys, channel up and down keys, and numeric keys.

The browsing display also contains a video window in which a video of the television program for the channel to which the system is currently tuned is displayed. The video window is not obstructed by any overlay information.

The browsing display also contains a detailed description of the highlighted program. The detailed description may include a plot summary, rating, critics rating, running time, actors, etc.

When the user positions the highlight region with the cursor keys or with the page up and down keys, the detailed description is automatically updated to correspond to the highlighted program. However, the television program displayed in the video window is unchanged. This allows the user to continue to watch the program in the video window while browsing the program listings. The contents of the video window may be synchronized with the highlighted program by pressing a remote control select key or the channel up and down keys.

If the user positions the highlight region with only the channel up and down keys, the contents of the video window and the highlight region are maintained in constant synchronization. This allows the user to browse the titles and detailed descriptions for various programs while viewing the programs in the video window.

The program guide may provide an info display for supplying additional information on a highlighted program. The program guide may provide the user with an opportunity to direct the program guide to display the additional information by pressing an info key.

Further features of the invention, its nature and various advantages will be more apparent from the accompanying drawings and the following detailed description of the preferred embodiments.

BRIEF DESCRIPTION OF THE DRAWINGS

FIG. 1 is a display screen of a conventional program guide having a program list with a highlight region and a video window that contains programming that is always synchronized with the highlight region.

FIG. 6 is an illustrative display screen showing how the highlight region may be moved from the initial top position in the program list of FIG. 5 to a position elsewhere in the list without changing the program displayed in the video window in accordance with the present invention.

FIG. 7 is an illustrative display screen showing that after the user has repositioned the highlight region as shown in FIG. 6, the user may synchronize the content of the video window with the highlighted program in accordance with the present invention.

FIG. 8 is an illustrative display screen showing how the highlighted program in the list and the video window may be synchronized using the channel up and down keys in accordance with the present invention.

FIG. 9 is an illustrative display screen showing how the user may scroll through the program list using page up and down keys in accordance with the present invention.

FIG. 10 is an illustrative display screen showing how the highlight region may be repositioned at the top of the list when a synchronization operation using the up and down channel keys causes the program list to highlight a program listing that is not already present on the display screen in accordance with the present invention.

DETAILED DESCRIPTION OF THE PREFERRED EMBODIMENTS

Figure 1:
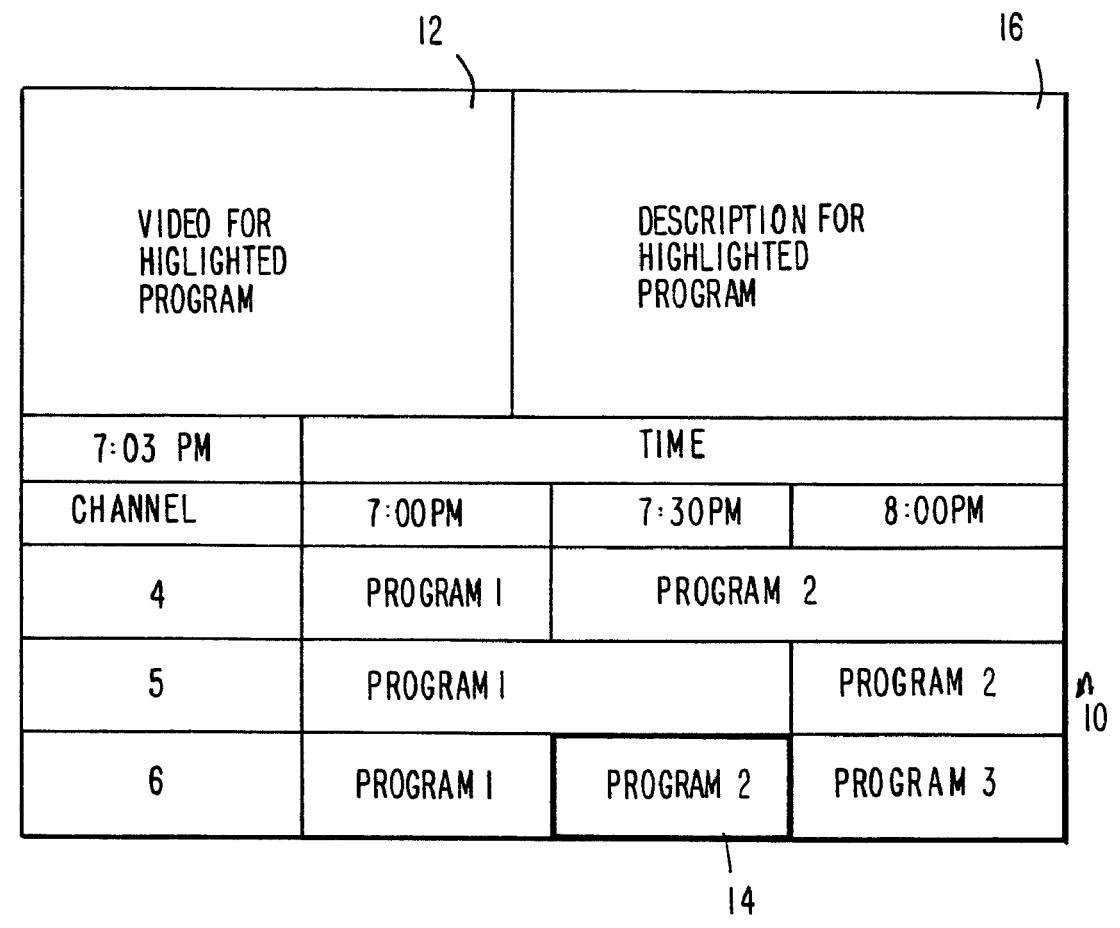

Conventional program guides have various program listings display screens that allow users to browse for programming of interest. As shown in FIG. 1, one such conventional program guide displays a grid 10 of television program listings and a video window 12. In the horizontal dimension, program listings in the grid are organized by their scheduled broadcast time (e.g., 7:00, 7:30, and 8:00). In the vertical dimension, program listings are organized in channel order. A highlight region 14 may be positioned by a user on a program listing of interest. The user may view information for additional channels and times by moving the highlight region to scroll or pan through the listings in grid 10. However, the content of video window 12 is maintained in constant synchronization with highlight region 14. Whenever highlight region 14 is moved, the program in video window 12 changes to the highlighted program. A description of the currently highlighted program is displayed in description window 16.

There are a number of disadvantages associated with the arrangement of FIG. 1. In particular, the program listings grid 10 has multiple grid cells in the horizontal dimension. If the user is only interested in programming that is currently being broadcast, the extra cells in the grid of FIG. 1 (i.e., the cells for future programming) merely clutter the display. In addition, because the content of video window 12 and highlight region 14 are continuously synchronized, the user cannot move the highlight region to browse through additional program listings without changing the program in video window 12. This prevents the user from paying close attention to a particular program of interest while the user browses the listings.

Figure 2:
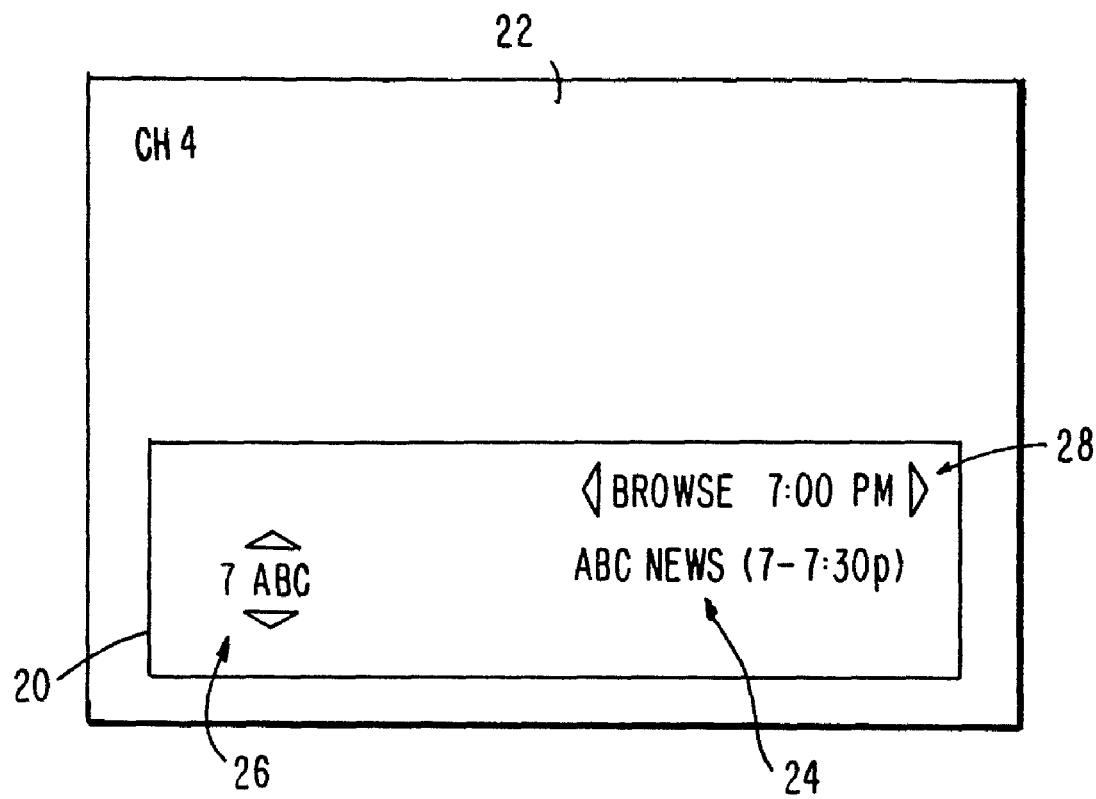
FIG. 2 is a display screen of a conventional program guide having a browse feature with which the user may view the titles of programs on channels other than the channel to which the system is presently tuned.

Another conventional program guide arrangement with which a user may browse program listings is shown in FIG. 2. In the arrangement of FIG. 2, the user may invoke a browse mode when it is desired to browse through program listings without changing the current channel. The program guide presents a browse display 20 that is overlaid on top of the current channel 22. The user may view single program titles 24 for channels other than the current channel 22 using cursor keys to change browse channel 26 and browse time 28.

However, the browse arrangement of FIG. 2 does not allow the user to view more than one program title at a time, which tends to make browsing through a large number of listings inefficient. Moreover, the user cannot tune to a channel of interest without exiting the browse mode. The user also cannot view detailed program descriptions for highlighted programs without taking additional actions in the program guide.

In contrast, the present invention provides a program guide having a browsing display that allows a user to browse a program list of currently available programs with a highlight region while viewing a television channel of interest in a video window. The program list is a single cell in width (i.e., in the time dimension) and multiple cells in length (i.e., in the channel dimension). A detailed program description window is provided for displaying a description of the highlighted program listing. If the user desires to view the program for a highlighted program listing, the user can synchronize the contents of the video window to the highlighted listing without exiting the browse display.

Figure 3:
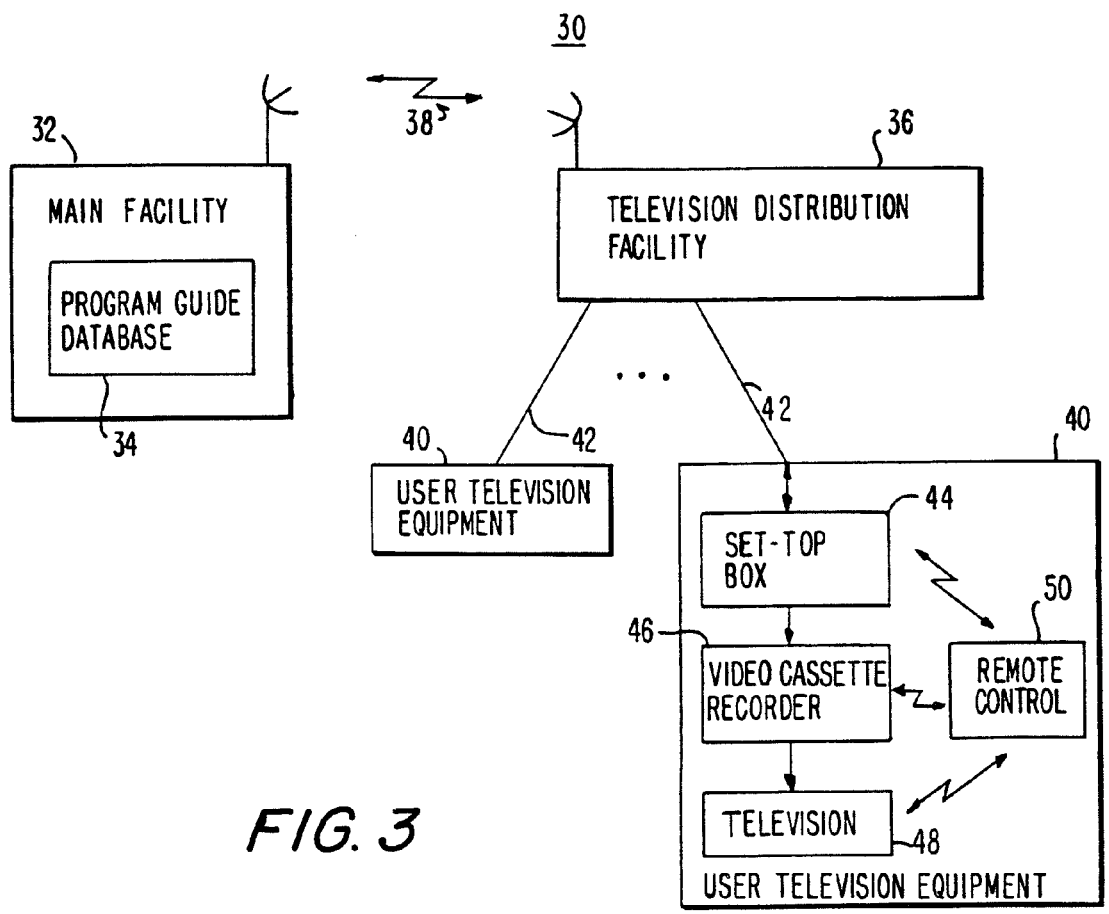
FIG. 3 is a diagram of a system in which an interactive television program guide is implemented in accordance with the present invention.

An illustrative program guide system 30 in accordance with the present invention is shown in FIG. 3. Main facility 32 contains a program guide database 34 for storing program guide information such as television program guide listings data, pay-per-view ordering information, television program promotional information, etc. Information from database 34 may be transmitted to television distribution facility 36 via communications link 38. Link 38 may be a satellite link, a telephone network link, a cable or fiber optic link, a microwave link, a combination of such links, or any other suitable communications path. If it is desired to transmit video signals over link 38 in addition to data signals, a relatively high bandwidth link such as a satellite link is generally preferable to a relatively low bandwidth link such as a telephone line.

Television distribution facility 36 is a facility for distributing television signals to users, such as a cable system head-end, a broadcast distribution facility, or a satellite television distribution facility.

The program guide information transmitted by main facility 32 to television distribution facility 36 includes television program listings data for current and future television programs. The television program listings data for each program preferably includes (but is not limited to) the title of the program, the channel for the program, a scheduled broadcast time (start time) and an ending time (or duration). Other typical program listings data include ratings, critics ratings, descriptions, genres (sports, movies, children, etc.), actors, etc. Transmitted program information may also include advertising information and pay program data such as pricing information for individual programs and subscription channels, time windows for ordering programs and channels, telephone numbers for placing orders that cannot be impulse ordered, etc.

Television distribution facility 36 distributes television programming and program guide information to the user television equipment 40 of multiple users via communications paths 42. For example, television programming may be distributed over analog television channels and program guide data may be distributed over an out-of-band channel on paths 42. Data distribution may also involve using one or more digital channels on paths 42. Such digital channels may also be used for distributing television programming and other information. User television equipment 40 typically contains set-top boxes 44. Multiple television and audio channels (analog, digital, or both analog and digital) may be provided to set-top boxes 44 via communications paths 42. If desired, program listings and other information may be distributed by one or more distribution facilities that are similar to but separate from television distribution facility 36 using communications paths that are separate from communications paths 42

Certain functions such as pay program purchasing may require set-top boxes 44 to transmit data to television distribution facility 36 over communications paths 42. If desired, such data may be transmitted over telephone lines or other separate communications paths. If functions such as these are provided using facilities separate from television distribution facility 36, some of the communications involving set-top boxes 44 may be made directly with the separate facilities.

Each user has a receiver, which is typically in a set-top box 44, but which may be other suitable television equipment into which circuitry similar to set-top-box circuitry has been integrated. Program guide data is distributed to set-top boxes 44 periodically. Television distribution facility 36 may also poll set-top boxes 44 periodically for certain information (e.g., pay program account information or information regarding programs that have been purchased and viewed using locally-generated authorization techniques). Main facility 32 preferably contains a processor to handle information distribution tasks. Each set-top box 44 preferably contains a processor to handle tasks associated with implementing an interactive television program guide on the set-top box 44. Television distribution facility 36 may contain a processor for tasks associated with monitoring a user's interactions with the interactive program guide implemented on set-top boxes 44 and for handling tasks associated with the distribution of program guide data and other information to user television equipment 40.

Each set-top box 44 may be connected to a videocassette recorder 46 so that selected television programs may be recorded. Each videocassette recorder 46 may be connected to a television 48. To record a program, set-top box 44 tunes to a particular channel and sends control signals to videocassette recorder 46 (e.g., using an infrared transmitter) that direct videocassette recorder 46 to start and stop recording at the appropriate times.

During use of the interactive television program guide implemented on set-top box 44, television program listings and other information may be displayed on television 48. Such program guide displays may be presented on top of a television program to which the user has tuned with set-top box 44 or may be presented in place of such a program. Each set-top box 44, videocassette recorder 46, and television 48 may be controlled by one or more remote controls 50 or any other suitable user input interface such as a wireless keyboard, mouse, trackball, dedicated set of buttons, etc.

Figure 4:
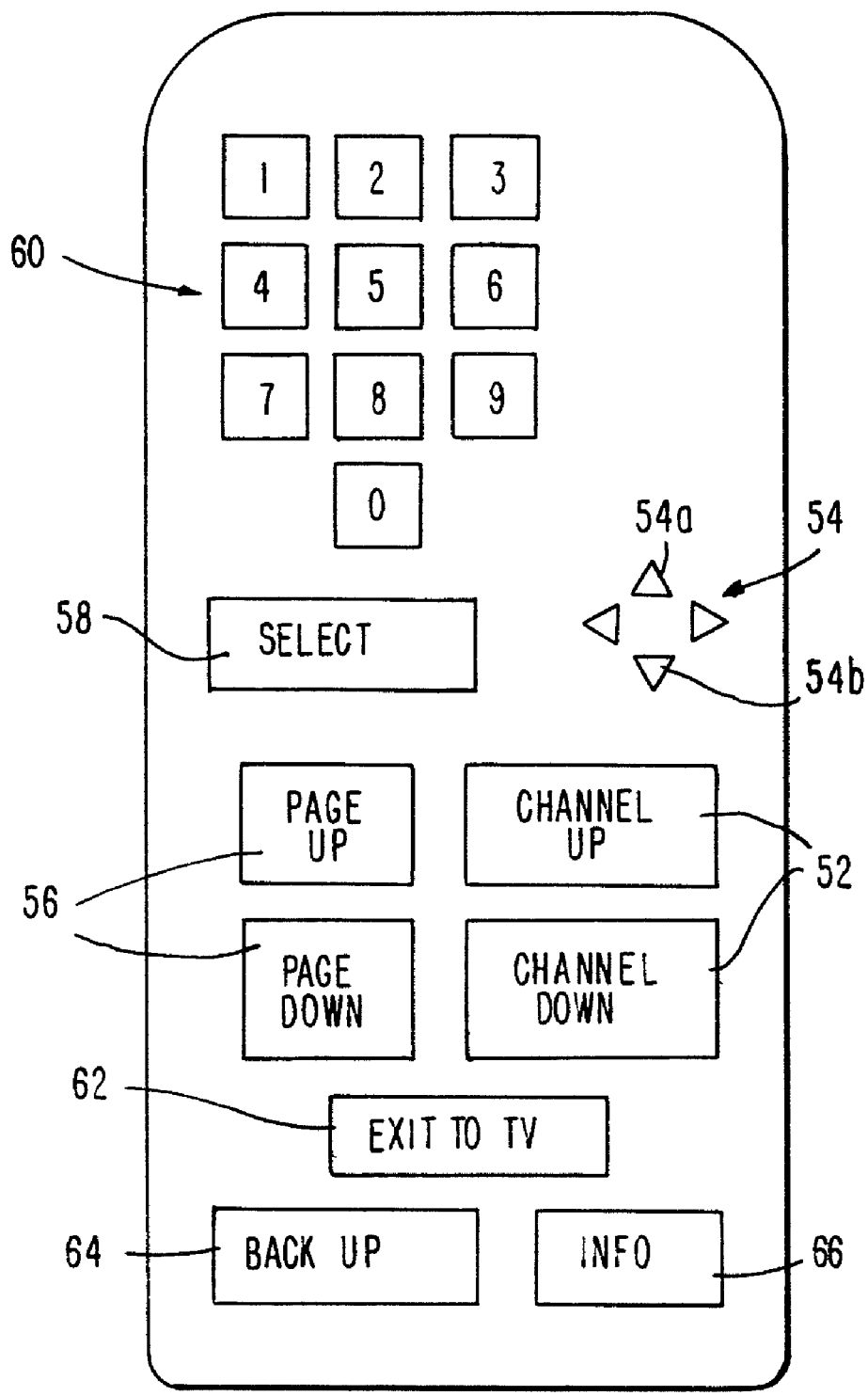
FIG. 4 is a diagram of an illustrative remote control for use with the program guide system of the present invention.

An illustrative remote control 50 is shown in FIG. 4. In normal operation, channel up and down keys (channel keys) 52 may be used to change the channel to which set-top box 44 is tuned. Up, down, left, and right cursor keys 54 may be used to position a highlight region on various on-screen menus and program lists presented by the program guide. Page up and down keys 56 may be used to scroll through program listings in larger increments than cursor keys 54. Select key 58 may be used to make menu selections. Numeric keys 60 may be used to direct-tune to a desired television channel during normal television viewing or may be used to position the highlight region within program lists. Exit to TV key 62 may be used to exit the program guide and cause set-top box 44 to display television programming for the current channel on television 48. Back up key 64 may be used in the program guide to back up to the previous display screen. Info key 66 may be pressed when the user has highlighted a program listing of interest and desires additional information for that listing. Various other keys (not shown) may be used for functions such as controlling power, videocassette recorder (VCR) functions, volume control, etc. The keys for remote control 50 of FIG. 4 represent just one illustrative example of a suitable remote control arrangement. Any other suitable remote control key arrangement may be used if desired.

Figure 5:
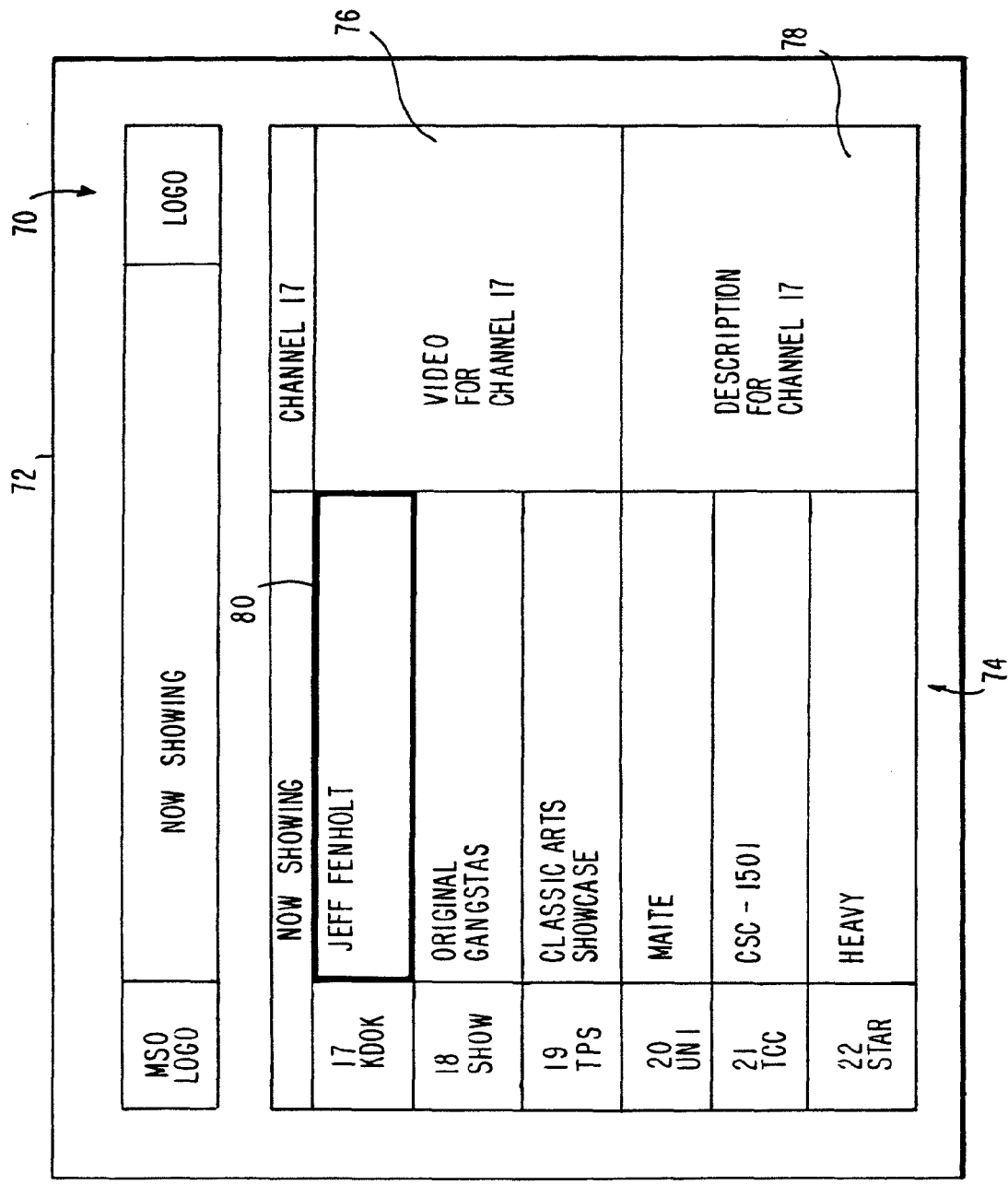
FIG. 5 is an illustrative display screen showing how a highlight region may initially be positioned in the top position in the program list while a video window is used to display the program for the highlighted channel in accordance with the present invention.

As shown in FIG. 5, the user may direct the program guide to present browsing display 70 on display screen 72 so that the user may view a list of current programs 74 while simultaneously viewing a television program in a video window 76. The user may invoke the browsing display mode using any suitable technique, such as by making a menu selection or, preferably, pressing a dedicated button on remote control 50 such as select key 58.

Program list 74 is preferably only a single cell or element in width (i.e., in the time dimension), but is multiple cells or elements in length (i.e., in the channel dimension). Only programs that are currently being broadcast (i.e., being provided by television distribution facility 36 of FIG. 3 via cable, satellite, or traditional broadcasting) are included in program list 74, so list 74 is not cluttered by cells containing information for future programming. Because list 74 contains multiple program listings in the vertical dimension, the user can scan through a relatively large number of program listings at a glance. Both the simplification of list 74 by displaying only current programming and the use of multiple program listings in the vertical dimension enhance the ability of the user to rapidly browse the program listings for a large number of currently available programs.

Browsing display 70 preferably contains a detailed program description box 78 that contains a detailed text description of the program associated with the program listing currently highlighted by highlight region 80. For example, in the arrangement shown in FIG. 5, the program "Jeff Fenholt" is highlighted, so detailed program description box 78 contains a detailed description of the Jeff Fenholt program. The highlight region may be a region of different shading, color, or pattern, a pointer, the outline of a box, or any other suitable visual indicator of the program of interest.

The user may position highlight region 80 on any of the program listings in list 74. Highlight region 80 may be positioned using any suitable technique. For example, highlight region 80 may be positioned using up and down cursor keys 54*a* and 54*b* (FIG. 4). Highlight region 80 may also be positioned on the listing for a channel of interest using numeric keys 60.

As the user changes the position of highlight region 80 with cursor keys 54 or numeric keys 60, the content of video window 76 does not change. The television program for the channel to which set-top box 44 is currently tuned continues to be displayed in video window 76, so long as the user does not take any action beyond repositioning highlight region 80 within list 74. This is shown in FIG. 6. Although the user has positioned highlight region 80 on top of the program listing for channel 19 in the browsing display of FIG. 6, the video in video window 76 remains tuned to channel 17. The content of video window 76 is therefore not always in synchronization with the currently highlighted program. However, each time highlight region 80 is repositioned, the program description 78 is immediately updated to display information for the currently highlighted program. This arrangement allows the user to view an unobstructed video of a television channel of interest while browsing program listings and their automatically displayed descriptions.

If a user who is browsing the program listings in list 74 becomes interested in a particular program, the user can direct the program guide to update video window 76 to display the video for that program. For example, if the user becomes interested in the program on channel 19 after reading its description, the user may press a key such as select key 58 (FIG. 4). As shown in FIG. 7, when the select key 58 is pressed, the program guide replaces the video for the current channel (channel 17) in video window 76 with the video for the new channel of interest (channel 19). In this way, the content of video window 76 may be brought into synchronization with the highlighted program.

Another way in which to bring the content of video window 76 into synchronization with highlight region 80 is to use channel up and down keys 52 (FIG. 4). For example, if the user has highlighted channel 19 while video window 76 is tuned to channel 17, as shown in FIG. 6, subsequently pressing the channel up key 52 (FIG. 4) causes the program guide to move highlight region 80 from the channel 19 program listing (Classic Arts Showcase) to the channel 18 program listing (Original Gangstas), as shown in FIG. 8. At the same time, the program in video window 76 is replaced with the program for channel 18, matching the program highlighted by highlight region 80 and thereby synchronizing video window 76 and highlight region 80.

Although using the channel up key 54 generally causes the system to tune to the next highest channel during normal television viewing, when the channel up key 54 is used to move highlight region 80 within list 74, pressing channel up key 54 tunes the system to the next lowest channel. With this arrangement, the direction of highlight region movement follows the direction of the channel up and down keys, which may be less confusing to the user than if the direction of highlight region movement were reversed.

If the user positions highlight region 80 on the top or bottom program of list 74, further attempts at movement of the highlight region may cause the program guide to scroll the list. For example, if the down cursor key 54 is used to move highlight region 80 to the bottom program position in list 74 in FIG. 8 (channel 22), pressing the down cursor key again causes the program guide to display the next program in the list (i.e., the program for channel 23) as the bottom element of list 74 while moving all of the other programs up one position in the list. Scrolling operations in the other direction are performed similarly.

Another way in which the user may browse the program listings in list 74 is to use page up and down keys 56. Using the page keys allows the user to browse through the listings more quickly than using the cursor keys. The program guide preferably ensures that there is a single element overlap between the programs in list 74 whenever the page keys are used. For example, if the user presses page down key 56 when highlight region 80 and program list 74 appear as in FIG. 8, the program guide will redraw list 74 with the last program in the list of FIG. 8 (Heavy) as the first program in the new list, as shown in FIG. 9. Highlight region 80 is preferably repositioned on the top program in list 74. Moving highlight region 80 with page up and down keys 56 (or numeric keys 60) does not cause the program guide to update the program in video window 76, which therefore remains tuned to the same channel as in the browsing display of FIG. 8.

When highlight region 80 is moved up and down through adjacent listings in list 74 with channel keys 52, the program displayed in video window 76 is in synchronization with the highlighted program as shown in the example of FIGS. 7 and 8. If, however, a channel up or down key 52 is pressed when the program listing for the channel adjacent to the channel in video window 76 is not already among the programs displayed in list 74, the program guide may redraw list 74 with the appropriate channel in the top list position. For example, in the browsing display of FIG. 9, the program for channel 18 is displayed in video window 76. Pressing the channel up key 52 will cause the program guide to tune the system to the appropriate adjacent channel—channel 17—and to display the program for that channel in video window 76, as shown in FIG. 10. Because the program listing for the program for channel 17 (Jeff Fenholt) did not appear on list 74 in FIG. 9, the program guide did not have the opportunity to simply reposition highlight region 80 within the existing list. Accordingly, the program guide displayed list 74 with the channel 17 program listing and highlight region 80 in the top list position. The description in detailed description window 78 remains synchronized with the highlighted program, as always.

Figure 11:
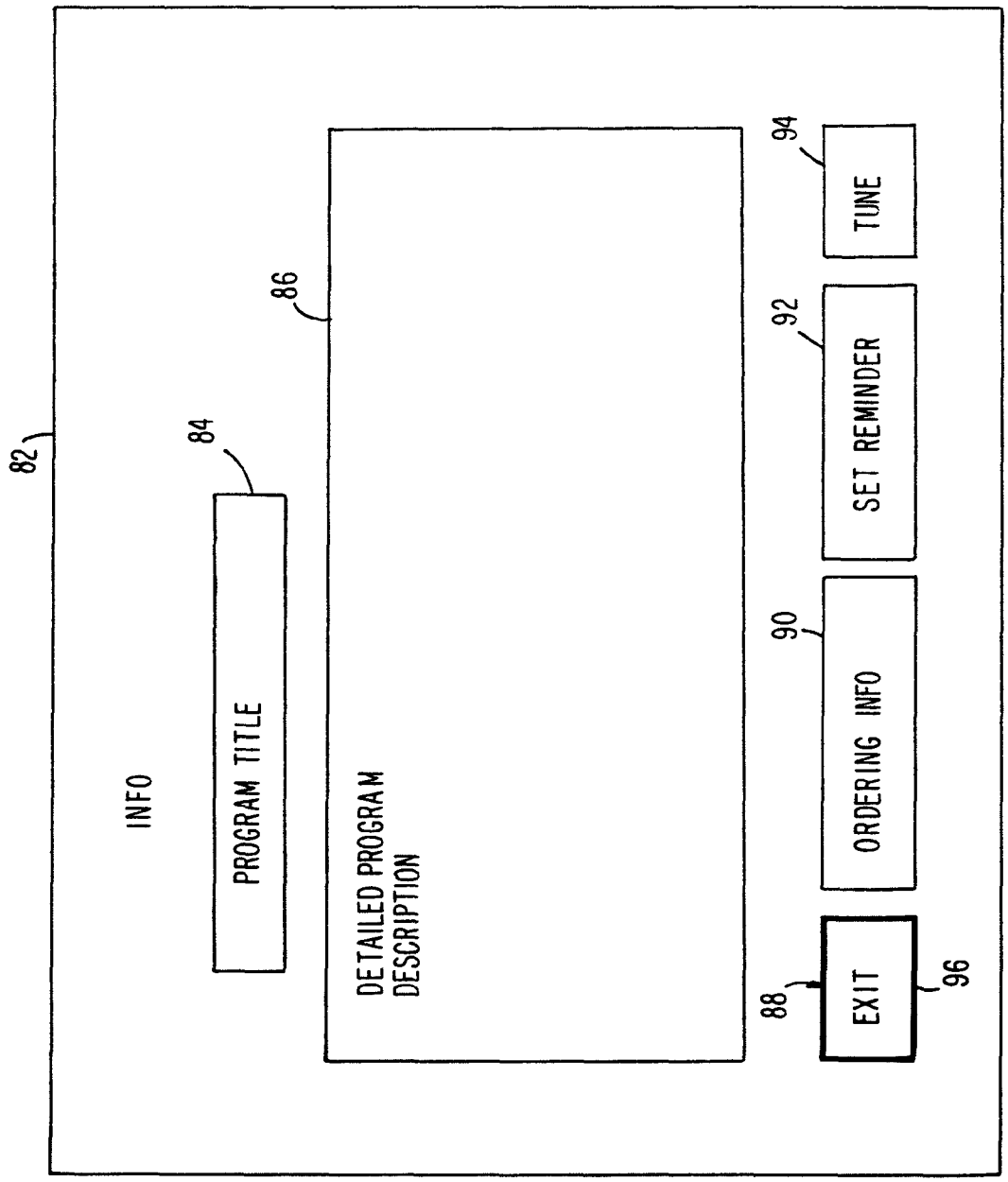
FIG. 11 is an illustrative info screen in accordance with the present invention.

The program guide may provide an opportunity for the user to obtain additional information on a highlighted program. For example, the program guide may allow the user to press an info key such as info key 66 of FIG. 4 that directs the program guide to display additional information in the form of info display screen 82 of FIG. 11. Into display screen 82 may contain the title 84 and a detailed description 86 for the highlighted program. Because more space is available in info display screen 82 than in detailed description window 78, more information may generally be provided in info display screen 82 than in detailed description window 78. Information that may be provided in screens such as information display screen 82 includes program descriptions, ratings, critic ratings, running times, actors, etc.

Info display screen 82 may contain menu options such as exit option 88, ordering info option 90, set reminder option 92, and tune option 94. The user may return to browsing display 70 by selecting exit option 88 with highlight region 96 or by pressing back up key 64 (FIG. 4) to view the previously displayed screen. The user may select ordering info option 90 to view information on ordering the selected program. The user may select set reminder option 92 to set a reminder. Set reminder option may be used, for example, if the program is a series and the user wishes to be reminded the next time the program is to be broadcast. Tune option 94 may be selected if the user wishes to tune to the listed program.

Figure 12:
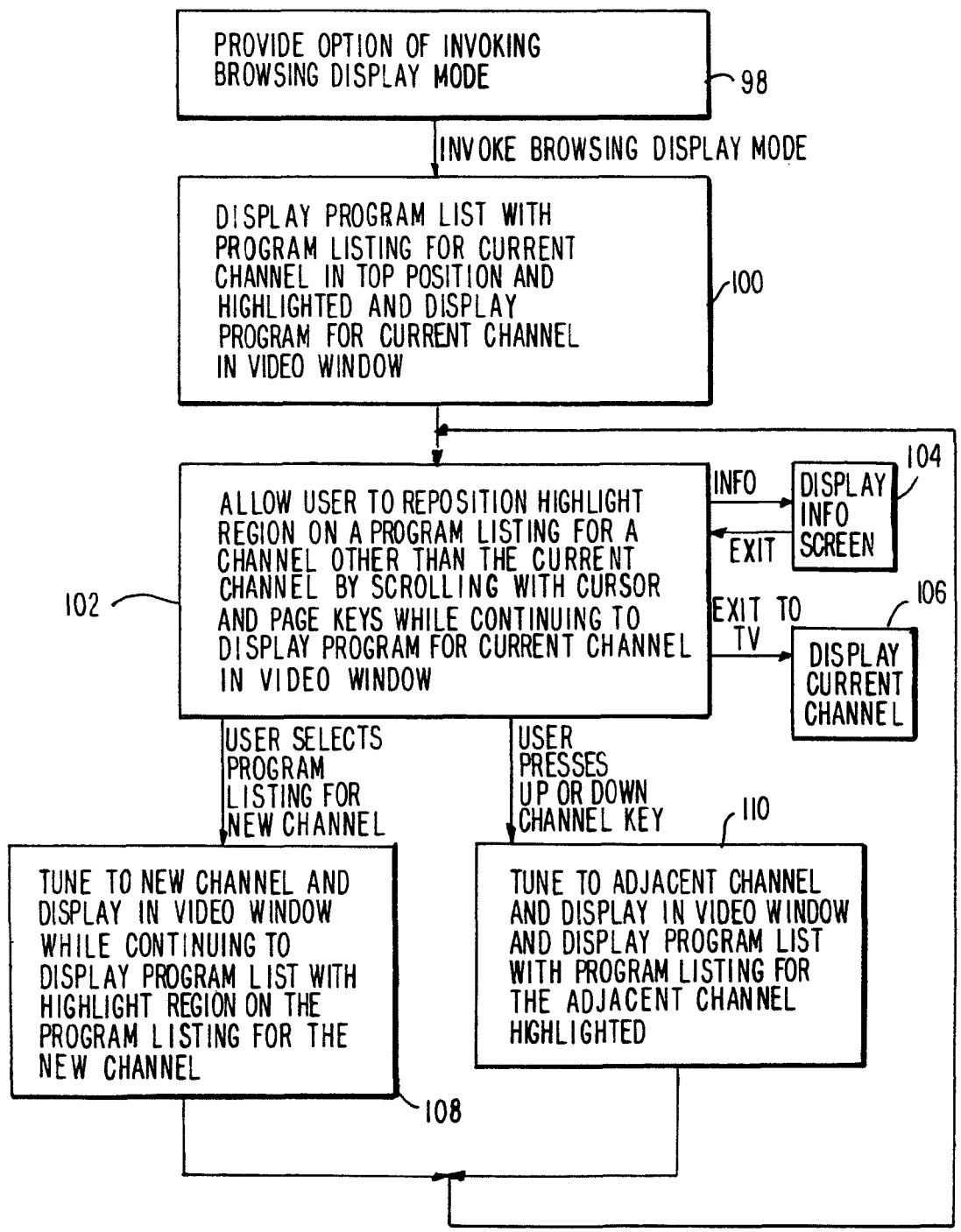
FIG. 12 is a flow chart of steps involved in providing the browsing display screen in accordance with the present invention.

Steps involved in providing the browsing display screen feature are illustrated in the flow chart of FIG. 12. At step 98, the program guide provides the user with an option for invoking the browsing display mode. For example, the program guide may allow the user to invoke the browsing display mode by pressing select key 58 of FIG. 4 while viewing a given television channel. If the user invokes the browsing display mode, the program guide displays a program list such as list 74 at step 100. The program listing for the current channel is preferably displayed in the top position on the list and is highlighted by a suitable highlight region. The program for the current channel is displayed in video window 76.

At step 102, the program guide allows the user to reposition highlight region 80 on a program listing other than the program listing for the program currently displayed in video window 76 without changing the program displayed in video window 76. The description in detailed description window 78 is synchronized with the highlighted program listing. The user may position highlight region 80 without changing the program displayed in video window 76 by using cursor keys, page up and down keys, or numeric keys. Pressing info key 66 causes the program guide to display info screen 82 (step 104). Pressing exit to TV key 62 allows the user to exit the program guide and return to normal television viewing (step 106).

If the user presses select key 58 after positioning highlight region 80 on a program listing for a new channel at step 102, the program guide tunes the system to that new channel at step 108. The program for the new channel is displayed in video window 76. Because the program guide also continues to display the program list 74 with highlight region 80 on the program listing for the new channel, the content of video window 76 is in synchronization with the highlighted program.

If the user presses up or down channel key 52 at step 102, the program guide tunes the system at step 110 to an new channel that is adjacent in channel number to the channel that was displayed in video window 76 at step 102. In addition, the program guide displays program list 74 at step 110 with the program listing for the new adjacent channel highlighted.

The foregoing is merely illustrative of the principles of this invention and various modifications can be made by those skilled in the art without departing from the scope and spirit of the invention.

What is claimed is:

1. An interactive guide system implemented on user equipment, comprising:
    means for simultaneously displaying (a) a program list that contains multiple program listings that only contains program listings for programs that are currently available, and that has a highlight region for highlighting a given one of the program listings, (b) a video window that contains an unobstructed view of a program, and (c) a detailed program description of the highlighted program listing;
    means for allowing the user to position the highlight region among the program listings;
    means for allowing the user to position the highlight region in the program list using a first selection, wherein when the first selection is used to position the highlight region on a new program listing, the detailed program description is updated to correspond to the highlighted program listing while maintaining unchanged the program displayed in the video window; and
    means for allowing the user to position the highlight region in the program list with a second selection, wherein the second selection is different than the first selection, and wherein when the second selection is used to position the highlight region on a new program listing, both the detailed program description and the program displayed in the video window are updated to correspond to the highlighted program listing.

2. The interactive program guide system defined in claim 1 further comprising means for synchronizing the program in the video window and the highlighted program listing after the user has positioned the highlight region on a new program listing with the first selection.

3. The interactive program guide system defined in claim 2 wherein the means for synchronizing further comprises means for providing the user with an opportunity to select the highlighted program listing.

4. The interactive program guide system defined in claim 3 wherein the means for providing the user with an opportunity to select the highlighted program listing further comprises means for allowing the user to select the highlighted program listing using an input device.

5. The interactive program guide system defined in claim 1 wherein the second selection comprises selection of up and down keys in an input device.

6. The interactive program guide system defined in claim 1 further comprising means for allowing the user to change the channel for the program that is displayed in the video window to an adjacent channel with the second set of keys in an input device.

7. The interactive program guide system defined in claim 1 wherein the first selection comprises cursor control keys.

8. The interactive program guide system defined in claim 1 wherein the first selection comprises selection of page up and down keys of an input device.

9. The interactive program guide system defined in claim 1 wherein the first selection comprises selection of numeric keys of an input device.

10. The interactive program guide system defined in claim 1 further comprising means for providing the user with an opportunity to display an information screen containing an additional description of the highlighted program listing.

11. The interactive program guide system defined in claim 1 further comprising means for providing the user with an opportunity to return to normal program viewing from the simultaneously displayed program list, video window, and detailed program description.

12. The interactive program guide system defined in claim 1 further comprising: means for displaying the program list with the highlight region repositioned at the top of the list on top of a program listing for an adjacent channel whenever the program listing for the adjacent channel does not appear on the program list when the user enters a first selection or a second selection to position the highlight region on the program listing for the adjacent channel.

13. A method for using an interactive program guide system implemented on user equipment, comprising the steps of:
    simultaneously displaying (a) a program list that contains multiple program listings that only contains program listings for programs that are currently available, and that has a highlight region for highlighting a given one of the program listings, (b) a video window that contains an unobstructed view of a program, and (c) a detailed program description of the highlighted program listing;
    allowing the user to position the highlight region among the program listings; allowing the user to position the highlight region in the program list with a first selection, wherein when the first selection is used to position the highlight region on a new program listing, the detailed program description is updated to correspond to the highlighted program listing while maintaining unchanged the program displayed in the video window; and
    allowing the user to position the highlight region in the program list with a second selection, wherein the second selection is different than the first selection, and wherein when the second selection is used to position the highlight region on a new program listing, both the detailed program description and the program displayed in the video window are updated to correspond to the highlighted program listing.

14. The method defined in claim 13 further comprising the step of synchronizing the program in the video window and the highlighted program listing after the user has positioned the highlight region on a new program listing with the first selection.

15. The method defined in claim 14 wherein the step of synchronizing further comprises the step of providing the user with an opportunity to select the highlighted program listing.

16. The method defined in claim 15 wherein the step of providing the user with an opportunity to select the highlighted program listing further comprises the step of allowing the user to select the highlighted program listing with a selection key of an input device.

17. The method defined in claim 13 wherein the second selection comprises selection of up and down keys of an input device.

18. The method defined in claim 13 further comprising allowing the user to change the channel for the program that is displayed in the video window to an adjacent channel with the second selection.

19. The method defined in claim 13 wherein the first selection comprises selection of cursor keys of an input device.

20. The method defined in claim 13 wherein the first selection comprises selection of page up and down keys of an input device.

21. The method defined in claim 13 wherein the first selection comprises selection of numeric keys of an input device.

22. The method defined in claim 13 further comprising the step of providing the user with an opportunity to display an information screen containing an additional description of the highlighted program listing.

23. The method defined in claim 13 further comprising the step of providing the user with an opportunity to return to normal program viewing from the simultaneously displayed program list, video window, and detailed program description.

24. The method defined in claim 13 further comprising: displaying the program list with the highlight region repositioned at the top of the list on top of a program listing for an adjacent channel whenever the program listing for the adjacent channel does not appear on the program list when the user presses one of the first selection or second selection to position the highlight region on the program listing for the adjacent channel.

25. An interactive program guide system implemented on user equipment, comprising: a processor for simultaneously displaying on a display (a) a program list that contains multiple program listings that only contains program listings for programs that are currently available, and that has a highlight region for highlighting a given one of the program listings, (b) a video window that contains an unobstructed view of a program, and (c) a detailed program description of the highlighted program listing; an input device for positioning the highlight region among the program listings; wherein a first selection using the input device positions the highlight region in the program list, and wherein the processor is configured to position the highlight region on a new program listing and update the detailed program description to correspond to the highlighted program listing while maintaining unchanged the program displayed in the video window when the first selection is used; and a second selection using the input device positions the highlight region in the program list, wherein the second selection is different than the first selection, and wherein the processor is configured to position the highlight region on a new program listing and update both the detailed program description and the program displayed in the video window to correspond to the highlighted program listing when the second selection is used.

26. The interactive program guide system defined in claim 25 wherein the input device is configured for synchronizing the program in the video window and the highlighted program listing after the user has positioned the highlight region on a new program listing with the first selection.

27. The interactive program guide system defined in claim 26 wherein the input device is further configured to allow the user to select the highlighted program listing.

28. The interactive program guide system defined in claim 27 wherein the input device further comprises a select key to select the highlighted program listing.

29. The interactive program guide system defined in claim 25 wherein the second selection comprises selection of up and down keys.

30. The interactive program guide system defined in claim 25 wherein the input device is further configured to allow the user to change a channel for the program that is displayed in the video window to an adjacent channel with the second selection.

31. The interactive program guide system defined in claim 25 wherein the first selection comprises selection of cursor keys.

32. The interactive program guide system defined in claim 25 wherein the first selection comprises selection of page up and down keys.

33. The interactive program guide system defined in claim 25 wherein the first selection comprises selection of numeric keys.

34. The interactive program guide system defined in claim 25 wherein the input device comprises a key for displaying an information screen containing an additional description of the highlighted program listing.

35. The interactive program guide system defined in claim 25 wherein the input device further comprises a key to return to normal viewing from the simultaneously displayed program list, video window, and detailed program description.

36. The interactive program guide system defined in claim 25 wherein the processor is configured to display the program list with the highlight region repositioned at the top of the list on top of a program listing for an adjacent channel whenever the program listing for the adjacent channel does not appear on the program list when the user presses one of the first selection or the second selection to position the highlight region on the program listing for the adjacent channel.

* * * * *